US007468337B2

(12) United States Patent
Zoitos et al.

(10) Patent No.: US 7,468,337 B2
(45) Date of Patent: *Dec. 23, 2008

(54) HIGH TEMPERATURE RESISTANT VITREOUS INORGANIC FIBER

(75) Inventors: Bruce K. Zoitos, Amherst, NY (US);
Michael J. Andrejcak, Niagara Falls, NY (US); Paul M. Boymel, Amherst, NY (US)

(73) Assignee: Unifrax I LLC, Niagra Falls, NY (US)

( * ) Notice: Subject to any disclaimer, the term of this patent is extended or adjusted under 35 U.S.C. 154(b) by 704 days.

This patent is subject to a terminal disclaimer.

(21) Appl. No.: 10/877,278

(22) Filed: Jun. 25, 2004

(65) Prior Publication Data

US 2005/0032620 A1 Feb. 10, 2005

Related U.S. Application Data

(60) Provisional application No. 60/483,169, filed on Jun. 27, 2003.

(51) Int. Cl.
*C03C 13/06* (2006.01)
*C03C 13/00* (2006.01)
*C03C 13/02* (2006.01)
*C03C 3/095* (2006.01)

(52) U.S. Cl. .................. 501/36; 501/35; 501/38; 501/64

(58) Field of Classification Search ............ 501/35, 501/36, 38, 64
See application file for complete search history.

(56) References Cited

U.S. PATENT DOCUMENTS

| 1,759,919 | A | 5/1930 | Singer |
| 2,051,279 | A | 8/1936 | Thorndyke |
| 2,335,220 | A | 11/1943 | Edwards |
| 2,576,312 | A | 11/1951 | Minnick |
| 3,183,104 | A | 5/1965 | Thomas |
| 3,189,471 | A | 6/1965 | Thomas |
| 3,348,994 | A | 10/1967 | Rees et al. |
| 3,380,818 | A | 4/1968 | Smith |
| 3,402,055 | A | 9/1968 | Harris et al. |
| 3,459,568 | A | 8/1969 | Rinehart |
| 3,573,078 | A | 3/1971 | Bacon |
| 3,597,179 | A | 8/1971 | Simmons |
| 3,687,850 | A | 8/1972 | Gagin |
| 3,783,092 | A | 1/1974 | Majumdar |
| 3,785,836 | A | 1/1974 | Bacon |
| 3,799,836 | A | 3/1974 | Rogers et al. |
| 3,804,608 | A | 4/1974 | Gaskell et al. |
| 3,804,646 | A | 4/1974 | Dumbaugh, Jr. |
| 3,854,986 | A | 12/1974 | Chvalovsky et al. |
| 3,887,386 | A * | 6/1975 | Majumdar .................. 106/711 |
| 3,900,329 | A | 8/1975 | Grubb et al. |
| 3,904,424 | A | 9/1975 | Aoki et al. |
| 4,002,482 | A | 1/1977 | Coenen |
| 4,011,651 | A | 3/1977 | Bradbury et al. |
| 4,036,654 | A | 7/1977 | Yale et al. |
| 4,046,948 | A | 9/1977 | Zlochower |
| 4,078,939 | A | 3/1978 | Schwochow |
| 4,102,692 | A | 7/1978 | Schartau et al. |
| 4,243,421 | A * | 1/1981 | Kume .................. 501/35 |
| 4,303,722 | A | 12/1981 | Pilgrim |
| 4,330,628 | A | 5/1982 | Cockram et al. |
| 4,363,878 | A | 12/1982 | Yamamoto et al. |
| 4,366,251 | A | 12/1982 | Rapp |
| 4,379,111 | A | 4/1983 | Smith et al. |
| 4,387,180 | A | 6/1983 | Jen et al. |
| 4,461,840 | A | 7/1984 | Massol et al. |
| 4,492,722 | A | 1/1985 | Ritter, II et al. |
| 4,542,106 | A | 9/1985 | Sproull |
| 4,558,015 | A | 12/1985 | Ekdahl et al. |
| 4,604,097 | A | 8/1986 | Graves, Jr. et al. |
| 4,615,988 | A | 10/1986 | Le Moigne et al. |
| 4,778,499 | A | 10/1988 | Beaver |
| 4,830,989 | A * | 5/1989 | Trivedi et al. .................. 501/35 |
| 4,882,302 | A | 11/1989 | Horiuchi et al. |
| 4,933,307 | A | 6/1990 | Marshall et al. |
| 5,055,428 | A | 10/1991 | Porter |
| 5,064,785 | A | 11/1991 | Kawamoto et al. |
| 5,108,957 | A | 4/1992 | Cohen et al. |

(Continued)

FOREIGN PATENT DOCUMENTS

AU         255803         7/1963

(Continued)

OTHER PUBLICATIONS

Alexander, Iain C. and Jubb, Gary A. "Development of a soluble high-temperature fibre," *Glastech. Ber. Glass Sci. Technol.*, vol. 70, No. 12, 1997.

(Continued)

*Primary Examiner*—Jerry Lorengo
*Assistant Examiner*—Elizabeth A Bolden
(74) *Attorney, Agent, or Firm*—Curatolo Sidoti Co. LPA; Joseph G. Curatolo; Salvatore A. Sidoti

(57) ABSTRACT

A temperature resistant vitreous inorganic fiber having a use temperature of up to at least 1000° C., or greater, having after service mechanical integrity, is non-durable (soluble) in physiological fluids, and is produced from a melt containing silica, magnesia, a lanthanide series element-containing compound, and optionally zirconia.

54 Claims, 2 Drawing Sheets

U.S. PATENT DOCUMENTS

| | | | |
|---|---|---|---|
| 5,250,488 A | 10/1993 | Thelohan et al. | |
| 5,284,807 A | 2/1994 | Komori et al. | |
| 5,332,699 A | 7/1994 | Olds et al. | |
| 5,569,629 A | 10/1996 | TenEyck et al. | |
| 5,583,080 A | 12/1996 | Guldberg et al. | |
| 5,585,312 A | 12/1996 | TenEyck et al. | |
| 5,714,421 A * | 2/1998 | Olds et al. | 501/36 |
| 5,811,360 A | 9/1998 | Jubb | |
| 5,821,183 A | 10/1998 | Jubb | |
| 5,874,375 A | 2/1999 | Zoitos et al. | |
| 5,928,975 A | 7/1999 | Jubb | |
| 5,955,389 A | 9/1999 | Jubb | |
| 5,962,354 A | 10/1999 | Fyles | |
| 5,994,247 A | 11/1999 | Jubb et al. | |
| 5,998,315 A | 12/1999 | Jubb | |
| 6,025,288 A | 2/2000 | Zoitos et al. | |
| 6,030,910 A | 2/2000 | Zoitos et al. | |
| 6,180,546 B1 | 1/2001 | Jubb et al. | |
| 7,160,824 B2 * | 1/2007 | Zguris et al. | 501/35 |
| 2002/0032116 A1 | 3/2002 | Jubb et al. | |
| 2003/0162019 A1 | 8/2003 | Zoitos et al. | |
| 2004/0254056 A1* | 12/2004 | Jubb et al. | 501/35 |
| 2005/0085369 A1* | 4/2005 | Jensen | 501/35 |

FOREIGN PATENT DOCUMENTS

| | | |
|---|---|---|
| CA | 2043699 | 6/1990 |
| CA | 1271785 | 7/1990 |
| CA | 2017344 | 11/1990 |
| EP | 144 349 | 6/1985 |
| EP | 076 677 | 1/1986 |
| EP | 390 223 | 10/1990 |
| EP | 399 320 | 11/1990 |
| EP | 412 878 | 2/1991 |
| EP | 459 897 | 12/1991 |
| EP | 1 323 687 | 7/2003 |
| FR | 2662687 | 6/1990 |
| GB | 520247 | 4/1939 |
| GB | 810773 | 3/1959 |
| GB | 1209244 | 10/1970 |
| GB | 2383793 | 7/2003 |
| JP | 51-13819 | 2/1976 |
| JP | 51-133311 | 11/1976 |
| WO | WO 84/04296 | 11/1984 |
| WO | WO 85/02393 | 6/1985 |
| WO | WO 85/02394 | 6/1985 |
| WO | WO 87/05007 | 8/1987 |
| WO | WO 89/12032 | 12/1989 |
| WO | WO 90/02713 | 3/1990 |
| WO | WO 92/07801 | 5/1992 |
| WO | WO 92/09536 | 6/1992 |
| WO | WO 94/15883 | 7/1994 |
| WO | WO 93/15028 | 11/1994 |
| WO | WO 01/19744 | 3/2001 |

OTHER PUBLICATIONS

Hayashi, Kunio et al. "Densification of Compacted Magnesium Alumino-Silicate Glass Powders," *Journal of the Ceramic Society of Japan*, Int. Edition, vol. 98.

Maier et al. *Nucleation and Crystallization in Mg-Al silicate-glass-ceramics*, cfi/ber.DKG 6/7, 1988, pp. 208-212.

Shyu, Jiin-Jyh and Wu, Jenn-Ming, "Effect of $TiO_2$ addition on the nucleation of apatite in an $MgO$-$CaO$-$SiO$-$P_2O_5$ glass," *Journal of Materials Science Letters*, vol. 10, 1991.

Vogel, Werner and Höland, Wolfram. "Nucleation and crystallization kinetics of an $MgO$-$Al_2O_3$-$SiO_2$ base glass with various dopants," pp. 125-145.

Wallenberger, Frederick T. "Inviscid Melt Spinning of Alumina Fibers: Chemical Jet Stabilization," *Journal of the American Ceramic Society*, vol. 75, No. 3, 1992.

\* cited by examiner

HIGH TEMPERATURE RESISTANT VITREOUS INORGANIC FIBER

CROSS REFERENCE TO RELATED APPLICATIONS

This application claims the benefit of the filing date under 35 U.S.C. §119(e) of U.S. Provisional Application No. 60/483,169 filed Jun. 27, 2003, which is hereby incorporated by reference.

BACKGROUND

A high temperature resistant vitreous fiber, useful as a heat or sound insulating material is provided, which has a use temperature at least up to 1000° C. The high temperature resistant fiber is easily manufacturable, exhibits low shrinkage, retains good mechanical strength after exposure to the service temperature, and is non-durable in physiological fluids.

The insulation material industry has determined that it is desirable to utilize fibers in heat and sound insulating applications which are not durable in physiological fluids, such as lung fluid. While candidate materials have been proposed, the use temperature limit of these materials have not been high enough to accommodate many of the applications to which high temperature resistant fibers, including refractory glass and ceramic fibers, are applied. In particular, high temperature resistant fibers should exhibit minimal linear shrinkage at expected exposure temperatures, in order to provide effective thermal protection to the article being insulated.

Many compositions within the man-made vitreous fiber family of materials have been proposed, which are decomposable in a physiological medium. These glass fibers generally have a significant alkali metal oxide content, which often results in a low use temperature limit.

Canadian Patent Application No. 2017344 describes a glass fiber having physiological solubility formed from glasses containing as required components silica, calcia and $Na_2O$, as preferred components, magnesia and $K_2O$, and as optional components boria, alumina, titania, iron oxides, and fluoride.

International Publication No. WO 90/02713 describes mineral fibers which are soluble in saline solutions, the fibers having a composition including silica, alumina, iron oxide, calcia, magnesia, $Na_2O$ and $K_2O$.

U.S. Pat. No. 5,108,957 describes glass compositions useful for forming fibers which are able to be degraded in a physiological medium containing as required components silica, calcia, $Na_2O$ plus $K_2O$, and boria, and optionally alumina, magnesia, fluoride and $P_2O_5$. It describes the presence of phosphorus as having the effect of increasing the rate of decomposition of the fibers in a physiological medium.

Other patents which cite the effect of phosphorus in favoring biological solubility of mineral fibers include International Publication No. WO 92/09536, describing mineral fibers containing substantially silica and calcia, but optionally magnesia and $Na_2O$ plus $K_2O$, in which the presence of phosphorus oxide decreases the stabilizing effect of aluminum and iron on the glass matrix. These fibers are typically produced at lower temperatures than refractory ceramic fibers. We have observed that at melt temperatures required for high temperature resistant fibers (1700-2000° C.), phosphorus oxide at levels as low as a few percent can cause severe degradation and/or erosion of furnace components.

Canadian Patent Application No. 2043699 describes fibers which decompose in the presence of a physiological medium, which contain silica, alumina, calcia, magnesia, $P_2O_5$, optionally iron oxide, and $Na_2O$ plus $K_2O$.

French Patent Application No. 2662687 describes mineral fibers which decompose in the presence of a physiological medium, which contain silica, alumina, calcia, magnesia, $P_2O_5$, iron oxide and $Na_2O$ plus $K_2O$ plus $TiO_2$.

U.S. Pat. No. 4,604,097 describes a bioabsorbable glass fiber comprising generally a binary mixture of calcia and phosphorous pentoxide, but having other constituents such as calcium fluoride, water, and one or more oxides such as magnesia, zinc oxide, strontium oxide, sodium oxide, potassium oxide, lithium oxide or aluminum oxide.

International Publication No. WO 92/07801 describes a bioabsorbable glass fiber comprising phosphorous pentoxide, and iron oxide. A portion of the $P_2O_5$ may be replaced by silica, and a portion of the iron oxide may be replaced by alumina. Optionally, the fiber contains a divalent cation compound selected from Ca, Zn and/or Mg, and an alkali metal cation compound selected from Na, K, and/or Li.

U.S. Pat. No. 5,055,428 describes a soda lime aluminoboro-silicate glass fiber composition which is soluble in a synthetic lung solution. Alumina content is decreased with an increase in boria, and an adjustment in silica, calcia, magnesia, $K_2O$ and optionally $Na_2O$. Other components may include iron oxide, titania, fluorine, barium oxide and zinc oxide.

International Publication No. WO 87/05007 describes an inorganic fiber having solubility in saline solution and including silica, calcia, magnesia, and optionally alumina. International Publication No. WO 89/12032 describes an inorganic fiber having extractable silicon in physiological saline solution and including silica, calcia, optionally magnesia, alkali metal oxides, and one or more of alumina, zirconia, titania, boria and iron oxides.

International Publication No. WO 93/15028 describes vitreous fibers that are saline soluble which in one usage crystallize to diopside upon exposure to 1000° C. and/or 800° C. for 24 hours and have the composition described in weight percent of silica 59-64, alumina 0-3.5, calcia 19-23 and magnesia 14-17, and which in another usage crystallize to wollastonite/pseudowollastonite and have the composition described in weight percent of silica 60-67, alumina 0-3.5, calcia 26-35 and magnesia 4-6.

International Publication No. WO 03/059835 discloses a calcium-silicate fiber containing 1.3-1.5 weight percent $La_2O_3$.

The fibers described in the above identified patent publications are limited, however, in their use temperature, and are therefore unsuitable for high temperature insulation applications, such as furnace linings for use above 1000° C., and reinforcement applications such as metal matrix composites and friction applications.

U.S. Pat. Nos. 6,030,910, 6,025,288 and 5,874,375, to Unifrax Corporation, the assignee of the present application, disclose particular inorganic fibers comprising the products of a substantially silica and magnesia fiberizable melt, that are soluble in physiological fluid and have good shrinkage and mechanical characteristics at a high use temperature limit.

A product based on non-durable fiber chemistry is marketed by Unifrax Corporation (Niagara Falls, N.Y.) under the trademark INSULFRAX, having the nominal weight percent composition of 65% $SiO_2$, 31.1% CaO, 3.2% MgO, 0.3% $Al_2O_3$ and 0.3% $Fe_2O_3$. Another product is sold by Thermal Ceramics (located in Augusta, Ga.) under the trademark SUPERWOOL, and is composed of 58.5% $SiO_2$, 35.4% CaO, 4.1% MgO and 0.7% $Al_2O_3$ by weight. This material has a use limit of 1000° C. and melts at approximately 1280° C., which is too low to be desirable for the high temperature insulation purposes described above.

International Application No. WO 94/15883 discloses CaO/MgO/SiO$_2$ fibers with additional constituents Al$_2$O$_3$, ZrO$_2$, and TiO$_2$, for which saline solubility and refractoriness were investigated. That document states that saline solubility appeared to increase with increasing amounts of MgO, whereas ZrO$_2$ and Al$_2$O$_3$ were detrimental to solubility. The presence of TiO$_2$ (0.71-0.74 mol %) and Al$_2$O$_3$ (0.51-0.55 mol %) led to the fibers failing the shrinkage criterion of 3.5% or less at 1260° C.

The document further states that fibers that are too high in SiO$_2$ are difficult or impossible to form, and cites samples having 70.04, 73.28 and 78.07% SiO$_2$ as examples which could not be fiberized.

U.S. Pat. Nos. 5,332,699, 5,421,714, 5,994,247, and 6,180,546 are directed to high temperature resistant, soluble inorganic fibers.

In addition to temperature resistance as expressed by shrinkage characteristics that are important in fibers that are used in insulation, it is also required that the fibers have mechanical strength characteristics during and following exposure to the use or service temperature, that will permit the fiber to maintain its structural integrity and insulating characteristics in use.

One characteristic of the mechanical integrity of a fiber is its after service friability. The more friable a fiber, that is, the more easily it is crushed or crumbled to a powder, the less mechanical integrity it possesses. It has been observed that, in general, refractory fibers that exhibit both high temperature resistance and non-durability in physiological fluids also exhibit a high degree of after service friability. This results in the fiber's lacking the strength or mechanical integrity after exposure to the service temperature to be able to provide the necessary structure to accomplish its insulating purpose.

We have found high temperature resistant, non-durable fibers which do exhibit good mechanical integrity up to the service temperature. Other measures of mechanical integrity of fibers include compression strength and compression recovery.

Refractory glass compositions which may exhibit target durability, shrinkage at temperature, and strength characteristics may not, however, be susceptible to fiberization, either by spinning or blowing from a melt of its components.

It is therefore desirable to provide high temperature resistant refractory glass fiber, that is readily manufacturable from a melt having a viscosity suitable for blowing or spinning fiber, and which is non-durable in physiological fluids.

It is also desirable to provide high temperature resistant refractory glass fiber, which is non-durable in physiological fluids, and which exhibits good mechanical strength up to the service temperature.

It is further desirable to provide a high temperature resistant refractory glass fiber, which is non-durable in physiological fluids, and which exhibits low shrinkage at the use temperature.

SUMMARY

High temperature resistant refractory vitreous inorganic fibers are provided which are non-durable in physiological fluids. The fibers are more soluble in simulated lung fluid than standard aluminosilicate refractory ceramic fibers, and exhibit a temperature use limit up to at least 1000° C. or greater. These fibers retain mechanical strength after exposure to service temperatures. The fibers meeting the requirements of being fiberizable, high temperature resistant, and non-durable in physiological fluids, have been identified in which the fiber compositions contain silica (SiO$_2$), magnesia (MgO), and at least one compound containing lanthanum or a lanthanide series element.

In certain embodiments, the fiber is manufactured from a melt of ingredients containing silica in an amount that is in the range of 71.25 to about 86 weight percent, magnesia, and a lanthanide series element-containing compound.

There is provided a low shrinkage, refractory, vitreous inorganic fiber based on a magnesium-silicate system having a use temperature up to at least 1000° C., which maintains mechanical integrity after exposure to the use temperature and which is non-durable in physiological fluids, such as lung fluid.

The non-durable refractory vitreous inorganic fiber, according to one embodiment, comprises the fiberization product of about 71.25 to about 86 weight percent silica, about 14 to about 28.75 weight percent magnesia, and about greater than 0 to about 6 weight percent of a compound containing a lanthanide series element. The lanthanide series element-containing compound may be, for example, a oxide of a lanthanide series element.

The non-durable refractory vitreous inorganic fiber, according to one embodiment, comprises the fiberization product of about 71.25 to about 86 weight percent silica, about 14 to about 28.75 weight percent magnesia, and about greater than 0 to about 6 weight percent of a compound, such as an oxide, containing a lanthanide series element and, optionally, zirconia. If zirconia is included in the fiberization melt, then it is included in an amount generally in the range of greater than 0 to about 11 weight percent.

According to a further embodiment, the non-durable refractory vitreous inorganic fiber comprises the fiberization product of about 71.25 to about 86 weight percent silica, about 14 to about 28.75 weight percent magnesia, and about greater than 0 to about 6 weight percent of a compound containing a lanthanide series element, and less than about 1 weight percent iron oxide impurity, calculated as Fe$_2$O$_3$. The lanthanide series element-containing compound may be, for example, a oxide of a lanthanide series element.

The high temperature resistant, non-durable fibers, according to certain embodiments, preferably contain less than about 2 weight percent alumina (Al$_2$O$_3$).

A process is provided for the production of high temperature resistant vitreous inorganic fiber having a use temperature up to at least 1000° C., which maintains mechanical integrity up to the service temperature and which is non-durable in physiological fluids comprising:

forming a melt with the ingredients comprising from about 71.25 to about 86 weight percent silica, about 14 to about 28.75 weight percent magnesia, and about greater than 0 to about 6 weight percent of a compound containing lanthanum or a lanthanide series element, and producing fibers from the melt.

A process is further provided for the production of high temperature resistant vitreous inorganic fiber having a use temperature up to at least 1000° C., which maintains mechanical integrity up to the service temperature and which is non-durable in physiological fluids comprising:

forming a melt with ingredients comprising about 71.25 to about 86 weight percent silica, about 14 to about 28.75 weight percent magnesia, and about greater than 0 to about 6 weight percent of a compound containing lanthanum or a lanthanide series element, and, optionally, zirconia; and producing fibers from the melt.

The melt compositions utilized to produce the fibers of the present invention provide a melt viscosity suitable for blowing or spinning fiber, and for imparting mechanical strength for exposure to service temperature.

A method is further provided for insulating an article, including disposing on, in, near or around the article, a thermal insulation material having a service temperature up to at least 1000° C., or greater, which maintains mechanical integrity up to the use temperature and which is non-durable in physiological fluids, said insulation material comprising the fiberization product of a fiber melt comprising silica, magnesia, a compound containing lanthanum or a lanthanide series element and, optionally, zirconia.

DETAILED DESCRIPTION

Figure 1A:
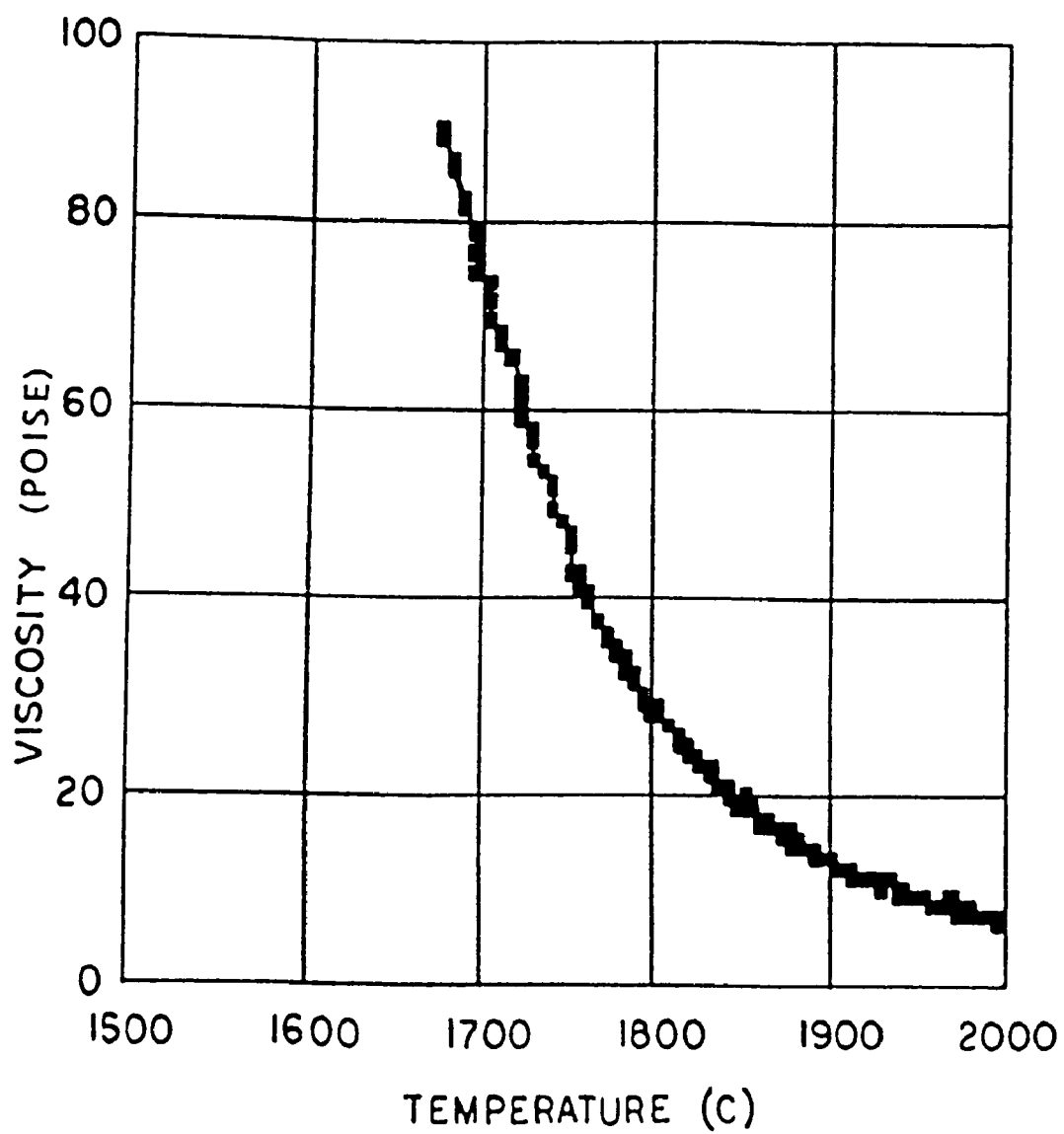
FIG. 1A is a viscosity vs. temperature curve of a melt chemistry for a commercially available, spun aluminosilicate fiber.
Figure 1B:
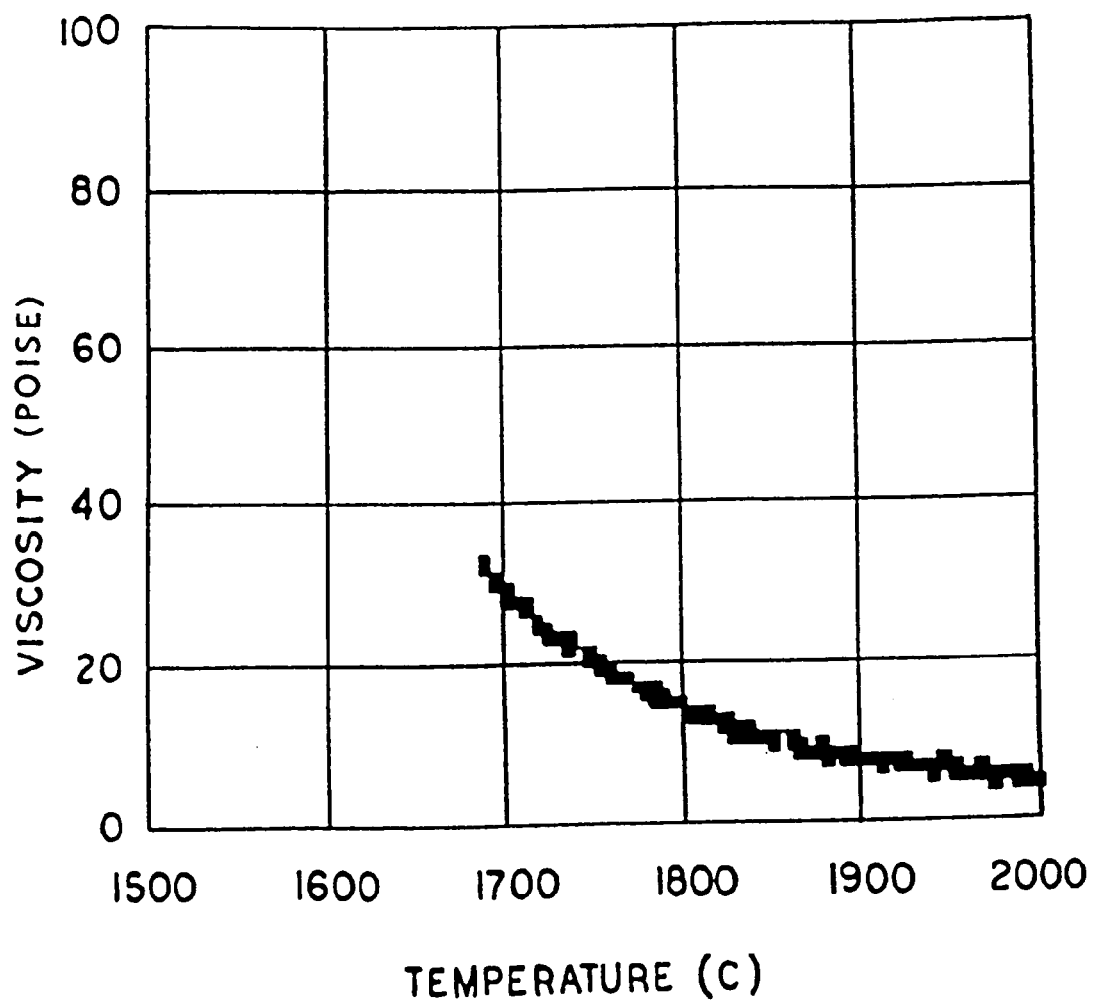
FIG. 1B is a viscosity vs. temperature curve of a melt chemistry for a commercially available, blown aluminosilicate fiber.

There is provided a high temperature resistant fiber useful as a heat, electrical, sound insulation material, which has a temperature use limit greater than 1000° C., and which is non-durable in physiological fluids, such as lung fluid. By non-durable in physiological fluids is meant that the fiber at least partially dissolves in such fluids (such as simulated lung fluid) during in vitro tests.

In order for a glass composition to be a viable candidate for producing a satisfactory high temperature refractory fiber product, the fiber to be produced must be manufacturable, sufficiently soluble in physiological fluids, and capable of surviving high temperatures with minimal shrinkage and minimal loss of mechanical integrity during exposure to the high service temperatures.

"Viscosity" refers to the ability of a glass melt to resist flow or shear stress. The viscosity-temperature relationship is critical in determining whether it is possible to fiberize a given glass composition. An optimum viscosity curve would have a low viscosity (5-50 poise) at the fiberization temperature and would gradually increase as the temperature decreased. If the melt is not sufficiently viscous (ie. too thin) at the fiberization temperature, the result is a short, thin fiber, with a high proportion of unfiberized material (shot). If the melt is too viscous at the fiberization temperature, the resulting fiber will be extremely coarse (high diameter) and short.

Viscosity is dependent upon melt chemistry, which is also affected by elements or compounds that act as viscosity modifiers. We have found for this fiber chemistry system, the lanthanide element containing compound acts as viscosity modifier which permit fibers to be blown or spun from the fiber melt. It is necessary, however, according to the present invention, that such viscosity modifiers, either by type or amount, do not adversely impact the solubility, shrink resistance, or mechanical strength of the blown or spun fiber.

Mechanical integrity is also an important property, since fiber must support its own weight in any application and must also be able to resist abrasion due to moving air or gas. Indications of fiber integrity and mechanical strength are provided by visual and tactile observations, as well as mechanical measurement of these properties of after-service temperature exposed fibers.

The fiber has a compressive strength within a target range comparable to that of a standard, commercial aluminosilicate fiber, and additionally has high compression recovery, or resiliency.

The fibers of the present invention are significantly less durable than normal refractory ceramic fiber, such as aluminosilicates (about 50/50 weight percent) and alumino-zirconia-silicates or AZS (about 30/16/54 weight percent) in simulated lung fluid.

The non-durable refractory vitreous fibers are made by standard glass and ceramic fiber manufacturing methods. Raw materials, such as silica, any suitable source of magnesia such as enstatite, forsterite, magnesia, magnesite, calcined magnesite, magnesium zirconate, periclase, steatite, or talc, and, if zirconia is included in the fiber melt, any suitable source of zirconia such as baddeleyite, magnesium zirconate, zircon or zirconia, are delivered in selected proportions from storage bins to a furnace where they are melted and blown using a fiberization nozzle, or spun, either in a batch or a continuous mode.

The viscosity of the melt may optionally be controlled by the presence of viscosity modifiers, sufficient to provide the fiberization required for the desired applications. The viscosity modifiers may be present in the raw materials which supply the main components of the melt, or may, at least in part, be separately added. Desired particle size of the raw materials is determined by furnacing conditions, including furnace size (SEF), pour rate, melt temperature, residence time, and the like.

A compound containing a lanthanide series element can be effectively utilized to enhance the viscosity of a fiber melt containing silica and magnesia as major components, thereby enhancing the fiberizability of the fiber melt. The use of the lanthanide element-containing compound enhances viscosity and improves fiberization without adversely impacting the thermal performance, mechanical properties, or solubility of the fiber product.

According to one embodiment, the refractory vitreous inorganic fiber is capable of withstanding a use temperature of at least up to 1000° C. with less than about 6% linear shrinkage, preferably less than about 5% linear shrinkage, exhibits mechanical integrity at the service temperature, and is non-durable in physiological fluids, such as lung fluid. The non-durable refractory vitreous inorganic fiber comprises the fiberization product of about 71.25 to about 86 weight percent silica, about 14 to about 28.75 weight percent magnesia, and about greater than 0 to about 6 weight percent of a compound containing lanthanum or a lanthanide series element. The fiberization melt from which the fiber product is manufactured may also include from 0 to about 11 weight percent zirconia.

The fiber should contain not more than about 1 weight percent calcia impurity. According to other embodiments, the fiber should not contain more than about 1 weight percent iron oxides impurity (calculated as $Fe_2O_3$). Other elements or compounds may be utilized as viscosity modifiers which, when added to the melt, affect the melt viscosity so as to approximate the profile, or shape, of the viscosity/temperature curve of a melt that is readily fiberizable, as discussed below.

Useful lanthanide series elements include La, Ce, Pr, Nd, Pm, Sm, Eu, Gd, Tb, Dy, Ho, Er, Tm, Yb, Lu and mixtures thereof. The element Y resembles many of the lanthanide series elements and is found with them in nature. For purposes of this specification, the element Y is to be considered to be included in the lanthanide series elements. In a certain embodiment, compounds containing the lanthanides elements La, Ce, Pr, Nd or combinations thereof can be added to the fiber melt. A particularly useful lanthanide series element that can be added to the fiber melt is La.

The compound containing a lanthanide series element may include, without limitation, lanthanide series element-containing bromides, lanthanide series element-containing chlorides, lanthanide series element-containing fluorides, lanthanide series element-containing phosphates, lanthanide series element-containing nitrates, lanthanide series element-containing nitrites, lanthanide series element-containing oxides, and lanthanide series element-containing sulfates.

The oxides of the lanthanide series elements are useful for enhancing the viscosity of a fiber melt containing silica and magnesia to enhance the fiberizability of the melt. A particularly useful oxide of a lanthanide series element is $La_2O_3$. $La_2O_3$ is commonly referred to in the chemical arts as "lanthanum" or "lanthanum oxide" and, therefore, these terms may be used interchangeably in the specification.

As described above, mixtures of lanthanide series element-containing compounds can be used in the fiber melt to enhance melt viscosity. Chemically, the lanthanide series elements are very similar and tend to be found together in ore deposits. The term "misch metal" is used to designate a naturally occurring mixture of lanthanide series elements. Further refining is required to separate and convert the misch metal oxide into its constituent misch metal oxides. Thus, misch metal oxide itself may be used as the lanthanide series element-containing compound in the fiber melt.

While alumina is a viscosity modifier, the inclusion of alumina in the fiber melt chemistry results in a reduction in the solubility of the resulting fiber in physiological saline solutions. It is, therefore, desirable to limit the amount of alumina present in the fiber melt chemistry to at least below about 2 weight percent, and, if possible, with raw materials used, to less than about 1 weight percent.

One approach to testing whether a fiber of a defined composition can be readily manufactured at an acceptable quality level is to determine whether the viscosity curve of the experimental chemistry matches that of a known product which can be easily fiberized. The addition of lanthanum oxide to a magnesium-silicate melt enhances fiberization by extending the viscosity curve of the melt to lower temperatures and high viscosities. As the lanthanum-silicate system is a more refractory system than the magnesium-silicate system, thermal performance of the resulting fiber is also enhanced.

The shape of the viscosity vs. temperature curve for a glass composition is representative of the ease with which a melt will fiberize and thus, of the quality of the resulting fiber (affecting, for example, the fiber's shot content, fiber diameter, and fiber length). Glasses generally have low viscosity at high temperatures. As temperature decreases, the viscosity increases. The value of the viscosity at a given temperature will vary as a function of composition, as will the overall steepness of the viscosity vs. temperature curve. The viscosity curve of melt of silica, magnesia, and lanthanum or other lanthanide series element-containing compound has a viscosity that approximates the target viscosity curve of FIG. 1A for the commercially available, spun aluminosilicate fiber.

The fiber comprises the fiberization product of about 65 and about 86 weight percent silica, about 14 to about 35 weight percent magnesia, and a lanthanide series element-containing compound.

The non-durable refractory vitreous inorganic fiber, according to a certain embodiment, comprises the fiberization product of about 71.25 to about 86 weight percent silica, about 14 to about 28.75 weight percent magnesia, and about greater than 0 to about 6 weight percent of a compound containing lanthanum or a lanthanide series element.

According to other embodiments, the non-durable, high temperature resistant vitreous inorganic fiber comprises the fiberization product of about 71.25 to about 86 weight percent silica, about 14 to about 28.75 weight percent magnesia, and about greater than 0 to about 6 weight percent of a compound containing lanthanum or a lanthanide series element, 0 to about 11 weight percent zirconia, and less than about 2 weight percent alumina.

In the melt and fibers discussed above, an operable silica level is between about 71.25 and about 86 weight percent, preferably between about 72 and about 80 weight percent, with the upper level of silica limited only by manufacturability of the fiber.

According to another embodiment, the non-durable, high temperature resistant vitreous inorganic fiber comprises the fiberization product of about 72 to about 80 weight percent silica, about 21 to about 28 weight percent magnesia, and from greater than 0 to about 6 of a lanthanide series element-containing compound. Of course, the sum of the amount silica, magnesia and lanthanide series element-containing compound, in weight percent, cannot exceed 100 weight percent.

According to a further embodiment, the non-durable refractory vitreous inorganic fiber comprises the fiberization product of about 71.25 to about 86 weight percent silica, about 14 to about 28.75 weight percent magnesia, and about greater than 0 to about 6 weight percent of a compound containing a lanthanide series element, wherein the fiber contains substantially no alkali metal oxide.

The fibers contain substantially no alkali metal, greater than trace impurities. The term "trace impurities" refers to those amounts of a substance in the fiberization product that are not intentionally added to the fiber melt, but which may be present in the raw starting materials from which the fibers are produced. Thus, the phrase "substantially no alkali metal oxide" means that the alkali metal oxide, if present in the fiber, is from the raw starting materials and the alkali metal oxide was not intentionally added to the fiber melt. Generally, the fibers may contain alkali metal oxide from the starting raw materials in amounts up to about tenths of a percent, by weight. Thus, the alkali metal content of these fibers is generally in the range of trace impurities, or tenths of a percent at most, calculated as alkali metal oxide. Other impurities may include iron oxides, in the amount of less than about 1 weight percent, calculated as $Fe_2O_3$, or as low as possible.

The non-durable, low shrinkage, vitreous inorganic fibers describd above compare favorably with conventional kaolin, AZS, and aluminosilicate durable refractory ceramic fibers in terms of mechanical strength up to service temperature.

The fibers are manufactured from a melt of ingredients containing silica, magnesia, a lanthanide series element-containing compound and, optionally, zirconia by known fiber spinning or blowing processes. The fibers may have fiber diameters that are only practical upper limit for fiber diameter is the ability to spin or blow product having the desired diameter.

The fiber may be manufactured with existing fiberization technology and formed into multiple product forms, including but not limited to bulk fibers, fiber-containing blankets, papers, felts, vacuum cast shapes and composites. The fiber may be used in combination with conventional materials utilized in the production of fiber-containing blankets, vacuum cast shapes and composites, as a substitute for conventional refractory ceramic fibers. The fiber may be used alone or in combination with other materials, such as binders and the like, in the production of fiber-containing paper and felt. The fiber is soluble in the simulated physiological lung fluid, thus minimizing concerns over fiber inhalation.

A method of insulating an article with thermal insulation material is also provided. According to the method of thermally insulating an article, thermal insulation material having a service temperature up to at least 1000° C. or greater, which maintains mechanical integrity up to the use temperature, and which is non-durable in physiological fluids, is disposed on, in, near or around the article to be insulated. The thermal insulation material utilized in the method of thermally insulating an article comprises the fiberization product of a melt of ingredients comprising silica, magnesia, a compound containing lanthanum or a lanthanide series element and, optionally, zirconia.

The high temperature resistant refractory glass fibers are readily manufacturable from a melt having a viscosity suitable for blowing or spinning fiber, and are non-durable in physiological fluids are provided.

The high temperature resistant refractory glass fibers are non-durable in physiological fluids, and exhibit good mechanical strength up to the service temperature.

The high temperature resistant refractory glass fibers are non-durable in physiological fluids, and exhibit low shrinkage at the use temperature.

EXAMPLE

Fibers were produced from a melt of ingredients containing silica, magnesia, and 1 weight percent $La_2O_3$ by a fiber blowing process. The shrinkage characteristics of the fibers were tested by wet forming fibers into a pad and measuring the dimensions of the pad before and after heating the shrinkage pad in a furnace for a fixed period of time.

A shrinkage pad was prepared by mixing the blown fibers, a phenolic binder, and water. The mixture of fiber, binder, and water was poured into a sheet mold and the water was allowed to drain through the bottom of the mold. A 3 inch×5 inch piece was cut from the pad and was used in the shrinkage testing. The length and width of the test pad was carefully measured. The pad was then placed into a furnace and brought to a temperature of 1260° C. for 24 hours. After heating for 24 hours, the pad was cooled and the length and width were measured again. The linear shrinkage of the test pad was determined by comparing the "before" and "after" dimensional measurements. The test pad, comprising fibers prepared in accordance with the present invention, exhibited a linear shrinkage of about 4% or less.

The present invention is not limited to the specific embodiments described above, but includes variations, modifications and equivalent embodiments. The embodiments that are disclosed separately are not necessarily in the alternative, as various embodiments of the invention may be combined to provide the desired characteristics.

We claim:

1. A low shrinkage, high temperature resistant vitreous inorganic fiber having a use temperature up to at least 1000° C. or greater, which maintains mechanical integrity up to the use temperature and which is non-durable in physiological fluids, comprising the fiberization product of greater than 71.25 weight percent silica, magnesia, and a lanthanide series element-containing compound.

2. The fiber of claim 1, wherein said lanthanide series element is selected from the group consisting of La, Ce, Pr, Nd, Pm, Sm, Eu, Gd, Tb, Dy, Ho, Er, Tm, Yb, and Lu.

3. The fiber of claim 2, wherein said lanthanide series element is La.

4. The fiber of claim 1, wherein said lanthanide series element-containing compound is selected from the group consisting of lanthanide series element-containing bromides, lanthanide series element-containing chlorides, lanthanide series element-containing fluorides, lanthanide series element-containing phosphates, lanthanide series element-containing nitrates, lanthanide series element-containing nitrites, lanthanide series element-containing oxides, and lanthanide series element-containing sulfates.

5. The fiber of claim 4, wherein said lanthanide series element-containing compound is $La_2O_3$.

6. The fiber of claim 1, further comprising from 0 to about 11 weight percent zirconia.

7. The fiber of claim 1, containing less than about 2 weight percent alumina.

8. The fiber of claim 1, containing less than about 1 weight percent iron oxide, calculated as $Fe_2O_3$.

9. The fiber of claim 1, containing substantially no alkali metal oxide.

10. The fiber of claim 1, containing less than about 1 weight percent calcia.

11. The fiber of claim 1, comprising the fiberization product of greater than 71.25 to about 86 weight percent silica, about 14 to about 35 weight percent magnesia, and greater than 0 to about 6 weight percent of a lanthanide series element-containing compound.

12. The fiber of claim 11, wherein said lanthanide series element is selected from the group consisting of La, Ce, Pr, Nd, Pm, Sm, Eu, Gd, Tb, Dy, Ho, Er, Tm, Yb, and Lu.

13. The fiber of claim 12, wherein said lanthanide series element is La.

14. The fiber of claim 11, wherein said lanthanide series element-containing compound is selected from the group consisting of lanthanide series element-containing bromides, lanthanide series element-containing chlorides, lanthanide series element-containing fluorides, lanthanide series element-containing phosphates, lanthanide series element-containing nitrates, lanthanide series element-containing nitrites, lanthanide series element-containing oxides, and lanthanide series element-containing sulfates.

15. The fiber of claim 14, wherein said lanthanide series element-containing compound is $La_2O_3$.

16. The fiber of claim 11, further comprising from 0 to about 11 weight percent zirconia.

17. The fiber of claim 11, containing less than about 2 weight percent alumina.

18. The fiber of claim 11, containing less than about 1 weight percent iron oxide, calculated as $Fe_2O_3$.

19. The fiber of claim 11, containing substantially no alkali metal oxide.

20. The fiber of claim 11, containing less than about 1 weight percent calcia.

21. The fiber of claim 1, comprising the fiberization product of greater than 71.25 to about 86 weight percent silica, about 14 to about 28.75 weight percent magnesia, and greater than 0 to about 6 weight percent of a lanthanide series element-containing compound.

22. The fiber of claim 21, wherein said lanthanide series element is selected from the group consisting of La, Ce, Pr, Nd, Pm, Sm, Eu, Gd, Tb, Dy, Ho, Er, Tm, Yb, and Lu.

23. The fiber of claim 22, wherein said lanthanide series element is La.

24. The fiber of claim 21, wherein said lanthanide series element-containing compound is selected from the group consisting of lanthanide series element-containing bromides, lanthanide series element-containing chlorides, lanthanide series element-containing fluorides, lanthanide series element-containing phosphates, lanthanide series element-containing nitrates, lanthanide series element-containing nitrites, lanthanide series element-containing oxides, and lanthanide series element-containing sulfates.

25. The fiber of claim 24, wherein said lanthanide series element-containing compound is $La_2O_3$.

26. The fiber of claim 21, further comprising from 0 to about 11 weight percent zirconia.

27. The fiber of claim 21, containing less than about 2 weight percent alumina.

28. The fiber of claim 21, containing less than about 1 weight percent iron oxide, calculated as $Fe_2O_3$.

29. The fiber of claim 21, containing substantially no alkali metal oxide.

30. The fiber of claim 21, containing less than about 1 weight percent calcia.

31. The fiber of claim 21, comprising fiberization product of about 72 to about 79 weight percent silica, about 21 to about 28 weight percent magnesia, and greater than 0 to about 6 weight percent of a lanthanide series element-containing compound.

32. The fiber of claim 31, wherein said lanthanide series element is selected from the group consisting of La, Ce, Pr, Nd, Pm, Sm, Eu, Gd, Tb, Dy, Ho, Er, Tm, Yb, and Lu.

33. The fiber of claim 32, wherein said lanthanide series element is La.

34. The fiber of claim 31, wherein said lanthanide series element-containing compound is selected from the group consisting of lanthanide series element-containing bromides, lanthanide series element-containing chlorides, lanthanide series element-containing fluorides, lanthanide series element-containing phosphates, lanthanide series element-containing nitrates, lanthanide series element-containing nitrites, lanthanide series element-containing oxides, and lanthanide series element-containing sulfates.

35. The fiber of claim 34, wherein said lanthanide series element-containing compound is $La_2O_3$.

36. The fiber of claim 31, further comprising from 0 to about 11 weight percent zirconia.

37. The fiber of claim 31, containing less than about 2 weight percent alumina.

38. The fiber of claim 31, containing less than about 1 weight percent iron oxide, calculated as $Fe_2O_3$.

39. The fiber of claim 31, containing substantially no alkali metal oxide.

40. The fiber of claim 31, containing less than about 1 weight percent calcia.

41. A method for preparing a low shrinkage, high temperature resistant vitreous fiber having a use temperature up to at least 1000° C. or greater, which maintains mechanical integrity up to the use temperature and which is non-durable in physiological fluids, comprising forming a melt with ingredients comprising greater than 71.25 weight percent silica, magnesia, and a lanthanide series element-containing compound; and producing fibers from the melt.

42. The method of claim 41, wherein the melt comprises from greater than 71.25 to about 86 weight percent silica, about 14 to about 35 weight percent magnesia, and greater than 0 to about 6 weight percent of a lanthanide series element-containing compound.

43. The method of claim 41, wherein the melt comprises from about 71.25 to about 86 weight percent silica, about 14 to about 28.75 weight percent magnesia, and greater than 0 to about 6 weight percent of a lanthanide series element-containing compound.

44. The method of claim 43, wherein the melt comprises from about 72 to about 79 weight percent silica, about 21 to about 28 weight percent magnesia, and greater than 0 to about 6 weight percent of a lanthanide series element-containing compound.

45. The method of claim 41, wherein said lanthanide series element is selected from the group consisting of La, Ce, Pr, Nd, Pm, Sm, Eu, Gd, Tb, Dy, Ho, Er, Tm, Yb, Lu and Y.

46. The method of claim 45, wherein said lanthanide series element is La.

47. The method of claim 41, wherein said lanthanide series element-containing compound is selected from the group consisting of lanthanide series element-containing bromides, lanthanide series element-containing chlorides, lanthanide series element-containing fluorides, lanthanide series element-containing phosphates, lanthanide series element-containing nitrates, lanthanide series element-containing nitrites, lanthanide series element-containing oxides, and lanthanide series element-containing sulfates.

48. The method of claim 47, wherein said lanthanide series element-containing compound is $La_2O_3$.

49. The method of claim 41, further comprising from 0 to about 11 weight percent zirconia.

50. The method of claim 41, containing less than about 2 weight percent alumina.

51. The method of claim 41, containing less than about 1 weight percent iron oxide, calculated as $Fe_2O_3$.

52. The method of claim 41, containing substantially no alkali metal oxide.

53. The method of claim 41, containing less than about 1 weight percent calcia.

54. A method of insulating an article, including disposing on, in, near or around the article, a thermal insulation material having a service temperature up to at least 1000° C., or greater, which maintains mechanical integrity up to the use temperature and which is non-durable in physiological fluids, said insulation material comprising the fiberization product of a melt of ingredients comprising greater than 71.25 weight percent silica, magnesia, a compound containing lanthanum or a lanthanide series element and, optionally, zirconia.

* * * * *